United States Patent [19]
Fitzgerald, Jr.

[11] 3,755,179
[45]* Aug. 28, 1973

[54] CHEMICAL COMPOSITION

[75] Inventor: Walter P. Fitzgerald, Jr., San Diego, Calif.

[73] Assignee: LRC Research and Development Company, Wilmington, Del.

[*] Notice: The portion of the term of this patent subsequent to Feb. 8, 1989, has been disclaimed.

[22] Filed: Mar. 2, 1971

[21] Appl. No.: 120,327

Related U.S. Application Data

[63] Continuation-in-part of Ser. No. 828,710, May 28, 1969, Pat. No. 3,640,879, which is a continuation-in-part of Ser. No. 791,512, Jan. 15, 1969, abandoned.

[52] U.S. Cl.................. 252/95, 8/109, 252/186, 252/187, 424/149

[51] Int. Cl............................................... C11d 7/54
[58] Field of Search.................. 252/95, 186, 187; 8/109; 424/149

[56] References Cited
UNITED STATES PATENTS

| | | | |
|---|---|---|---|
| 3,491,028 | 1/1970 | Crotty et al.............. | 252/95 X |
| 3,171,814 | 3/1965 | Orazem et al.............. | 252/187 |

*Primary Examiner*—Mayer Weinblatt
*Attorney*—Connolly & Hutz

[57] ABSTRACT

A chemical composition comprising a mixture of alkali and/or alkaline earth metal hypochlorites and, as a stabilizing and/or reinforcing agent, alkali and/or alkaline earth metal pyrosulfates.

4 Claims, No Drawings

CHEMICAL COMPOSITION

REFERENCE TO RELATED APPLICATIONS

This application is a continuation-in-part of application Ser. No. 828,710 filed May 28, 1969, now U.S. Pat. No. 3,640,879 issued Feb. 8, 1972 which in turn is a continuation-in-part of application Ser. No. 791,512, filed Jan. 15, 1969, now abandoned.

BACKGROUND OF THE INVENTION

In the aforementioned applications I disclosed and claimed a chemical composition well suited as a cleaning agent, for example, as a dental prostheses cleaner. This composition, comprising the combination of lithium hypochlorite, an alkali metal pyrosulfate, alkali metal bisulfate and/or mixtures thereof, preferably potassium pyrosulfate, and an alkali metal hydroxide was found to be highly effective as a cleaner because, particularly in its preferred embodiments, it combined the features of solid chemicals highly stable in admixture with outstanding and long-term cleaning ability for plastics, metals, porcelains, glass and the like.

SUMMARY OF THE INVENTION

The present invention relates to the combination of alkali and/or alkaline earth metal hypochlorites, which are alone strong oxidizing agents, with alkali and/or alkaline earth metal pyrosulfates, which appear to act as a stabilizer and/or reinforcing agent for the hypochlorite, alone or in combination with supplemental agents such as surface active agents, pH adjusting agents and the like. The pyrosulfate and hypochlorite are admixed in widely varying proportions depending upon the ultimate end use desired. These proportions can range broadly from about 1 to 99 parts by weight pyrosulfate to 99 to 1 parts by weight hypochlorite.

DETAILED DESCRIPTION OF THE INVENTION

The terms alkali metal and alkaline earth metal as used herein are meant in their normal sense to include such metals as sodium, potassium, lithium, magnesium, calcium and barium. As might be expected by the chemical relationship of these metals, mixtures of two or more hypochlorites and pyrosulfates are equally possible.

Some pyrosulfates of such metals are commercially available, such as potassium pyrosulfate, also known as fused potassium bisulfate. Normally this product as obtained commercially is made up of a mixture of pyrosulfate and bisulfate, the latter being the accidental hydrolysis product of the pyrosulfate since the former is obtained by driving off water from the bisulfate usually by the application of heat. The term "pyrosulfate" as employed herein is intended to mean the grades and purities of pyrosulfate commercially available although, in general, an assay of at least 40 percent pyrosulfate is advisable to obtain the full benefits of the invention.

Methods of producing the metal pyrosulfates are well known and for a particular metal can follow the analogous procedure for preparing potassium pyrosulfate. Lithium pyrosulfate can be prepared for example by the manner described by Arnold and Lehmann, Z. Anorg. Allg. Chem., 354, 56–59 (1967); Chem. Abs. 67, 104662 (1967). Potassium pyrosulfate can be prepared by numerous chemical methods such as described in Chem. Abs. 47, 9840 (1953); 57, 16005 (1962) and 58, 12158 (1963). The production of sodium pyrosulfate is described at Chem. Abs., 69, 102597 (1968) and of calcium pyrosulfate at Chem. Abs., 68, 45844 (1968).

The pyrosulfate, regardless of the specific metal, is characterized by the $^-S_2O_7$ ion and has the general formula $M_xS_2O_7$ wherein M stands for the particular metal and x stands for one or two, depending on the valency of the metal.

The metal hypochloride is, per se, a well-known compound whose methods of manufacture were well established many years ago, such as by electrolysis of a sodium chloride solution or chlorination of a slurry of line and caustic soda with subsequent precipitation of calcium hypochlorite dihydrate which is then dried under vacuum. Since those methods are well known in the literature, they will not be repeated here. It may be solid (such as lithium and calcium hypochlorite) or liquid (such as sodium hypochlorite which is unstable in air and is normally stored and used in solution with sodium hydroxide as a stabilizer). As with the pyrosulfate, it may be employed in its commercially available grades such as technical, analytical or reagent. Because of differing physical characteristics as between the metal hypochlorites, selection depends primarily on cost, intended use, stability and the liquid or solid nature desired of the ultimate product.

While I do not wish to be bound by any theory underlying the action of this unique chemical combination, it appears that the hypochlorite, itself a strong oxidizing agent, may be stabilized by the action of the pyrosulfate. Particularly in the presence of water, either as a solution or ambient moisture picked up by the chemicals from the air, the release of active oxidizing agent from the hypochlorite appears to be attenuated by the pyrosulfate to preserve and/or obtain slow release of the oxidizing power of the hypochlorite. This factor can be advantageously utilized to either prolong the activity of the hypochlorite in aqueous solutions or to prevent loss in potency during storage of the dry hypochlorite, that is, increase its storage stability.

Alternatively, the pyrosulfate (e.g., potassium pyrosulfate) and hypochlorite (e.g., lithium hypochlorite) may undergo, particularly in the presence of water at ambient temperatures, the following reaction:

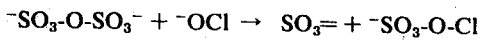

$$^-SO_3\text{-O-}SO_3^- + {}^-OCl \rightarrow SO_3^= + {}^-SO_3\text{-O-Cl}$$

The reaction product itself may be a new product.

Regardless of the precise mechanism involved, the mixture of the two ingredients, alone or in combination with supplemental ingredients, later defined, provides a novel combination with many advantageous properties.

Supplemental ingredients include thickening agents, inert or even active supports (as in the case of catalysts), surface active agents (as in the case of cleaning uses), indicators, chelating agents, dyes, free-flowing agents, masking agents, perfumes, fragrances, bonding agents (as in shaping tablets) and the like. The product, in its commercial state, may partake of liquid, powder, pellet, bread, wafer or other physical form suitable for the particular end use desired. Moreover, agents to provide varying pH are sometimes desired. Such agents include alkali and alkaline earth metal hydroxides such as lithium and sodium hydroxide which can be employed to raise the pH of an aqueous solution containing the chemicals to the alkaline side, say in excess of 8, generally 9 to 14 and preferably from 10 to 12.

Supplemental agents, their nature and use are more fully described in my aforesaid-mentioned applications when the combination is intended for cleaning purposes, the disclosures of which are incorporated herein by reference.

The relative amounts of pyrosulfate and hypochlorite can vary widely depending on the end use intended. Broadly speaking this may vary from about 1 to 99 parts by weight hypochlorite for 99 to 1 parts by weight pyrosulfate. In cleaning applications, particularly with an alkaline pH, the proportions may vary on a weight ratio of from about 1:3.5 to 3.5:1 preferably on an equal weight basis. For other applications such as in stabilizing bulk hypochlorite used on an industrial scale or in the disinfecting and purification of water (e.g., in swimming pools where it also acts to kill algae) relatively small amounts of pyrosulfate based on hypochlorite may be employed (for illustration purposes from 0.25 to 5 percent by weight, preferably 0.5 to 2.5 percent.

The composition according to the present invention should find utility in a number of potential areas. These include as an initiator of vinyl polymerization, oxidative treatment of polyethylene film surfaces to render same printable, bactericide and algaecide in water treatment and general bleaching of paper, fabric, wood and the like.

In the catalytic field, mixtures of metal pyrosulfate and metal hypochlorite alone or with co-catalysts, with or without suitable supports, may be used in various fields such as replacing the pyrosulfate employed in admixture with bis(1,5-cyclo-octadienyl) nickel to prepare poly(butadiene) rubber with essentially cis structure as disclosed, for example, by Dawans and Teyssie, C.R. *Acad. Sci.*, Paris, Ser. C–263 (25), 1512 (1966) (cf. *Chem. Abs.*, 66 47063 (1967). Other catalytic uses for the mixture according to the claimed invention may be obtained by replacement of pyrosulfate in various processes such as those disclosed in French Pat. No. 1,447,472, July 29, 1966 (Chem. Abs. 66 P 66051 (1967); Netherlands application 6,406,764 (Chem. Abs. 64, PC 17432 (1966)); Chem. Abs., 68, 117462 (1963); Chem. Abs. 69, 70633 (1968); Chem. Abs., 65, P 20068 (1966); Chem. Abs., 55, 18033 (1961) and Chem. Abs. 64, 6488 (1966), all of which references are incorporated herein by reference.

The following examples serve to further illustrate the nature of the invention and are not intended to impliedly or expressly restrict the nature thereof.

EXAMPLE 1

A mixture consisting of 5.0 grams of potassium pyrosulfate, 5.0 grams of lithium hypochlorite, 2.0 grams of lithium hydroxide, and 1.0 gram of Duponol C (E. I. du Pont de Nemours' brand of sodium lauryl sulfate) was prepared by grinding the ingredients separately to remove lumps or large particles and mixing the resulting dry powders. The resulting mixture was a white, free-flowing powder and was packaged in various dosages for further use.

An 8.0 gram quantity of the mixture described above was dissolved in 100 milliliters of hot water (approximately 140°F. tap water). With slight swirling of the mixture, solution was rapid and complete, giving a pH of 11. A solid denture (complete upper or lower plate) was immersed in the solution for 15 minutes. Upon removal and rinsing with water, all tar and nicotine stains had been removed together with the calculus, food debris, and other solid materials. The porcelain, acrylic, and metal portions of the denture were bright and shining and resembled those of a freshly manufactured, unused denture.

EXAMPLE 2

A mixture is prepared by grinding together with a mortar and pestle 5.0 grams potassium pyrosulfate, 3.0 grams lithium hypochlorite, 2.0 grams lithium chloride, 2.0 grams lithium hydroxide and 1.0 grams sodium lauryl sulfate. The article to be cleaned, in this case a denture, is covered with about 100 ml of hot tap water (70°C.). To this is added 10 grams of the above mixture with sufficient agitation to promote dissolution.

Soaking is accomplished for 30 minutes and the denture is then removed, rinsed with warm water and dried. The denture is restored to a clean, lustrous, tasteless condition.

EXAMPLES 3–9

In a manner similar to Example 1, the following dry formulations are prepared:

| Ingredients, percent by weight | Example | | | | | | |
|---|---|---|---|---|---|---|---|
| | 3 | 4 | 5 | 6 | 7 | 8 | 9 |
| Potassium pyrosulfate | 40 | 45 | 42 | 30 | 38 | 25 | 30 |
| Lithium hypochlorite | 40 | 35 | 33 | 44 | 25 | 55 | 20 |
| Lithium chloride | | | | 15 | | 5 | 20 |
| Lithium hydroxide | 14 | 7 | 17 | | 25 | 10 | 20 |
| Surface active agent | [1] 6 | [2] 6 | [1] 8 | [1] 2 | [2] 12 | [1] 5 | [1] 10 |
| Sodium hydroxide | | 7 | | 9 | | | |

[1] Sodium lauryl sulfate.
[2] Sodium dodecyl benzene sulfonate.

When the above compositions are dissolved in 100 ml of water in an amount ranging from 1 to 15 grams per 100 ml, they effectively clean a variety of dentures in a short period of time without adverse effect on the denture material.

EXAMPLE 10

A mixture consisting of 4.0 grams of potassium pyrosulfate, 5.5 grams of lithium hypochlorite, 2 grams of lithium hydroxide and 2 grams of sodium lauryl sulfate is ground together and the resulting dry composition is added in an amount of 5 grams to 100 milliliters of tap water (room temperature).

Various articles such as small gold jewelry pieces, a heating aid ear piece and a denture when immersed in the resulting solution are cleaned and restored to a bright and shining appearance after from 25 to 60 minutes of soaking.

In the above formulations, the potassium pyrosulfate can be replaced by equivalent amounts of other pyrosulfates such as sodium, lithium and/or calcium pyrosulfate and the lithium hypochlorite can be replaced by equivalent amounts of calcium and/or sodium hypochlorite, the resulting compositions varying in physical form depending upon the liquid and solid form of the base chemicals.

In other applications, such as the use of metal hypochlorite in bulk form for industrial (e.g., bleaching) and sterilization purposes, the metal pyrosulfate can be added in relatively minor amounts say from 0.5 to 50 percent by weight based on metal hypochlorite and, as illustration, in 0.5, 2.5, 5 and 10 percent by weight. In such instances, the metal pyrosulfate should serve to preserve the activity of the metal hypochlorite during storage and after addition to aqueous liquids. Such admixtures, with or without the usual supplemental agents commonly used in industrial or household applications (e.g., common household bleaching and washing applications) find many applications wherein prolonged stability and activity are desired.

In the above-mentioned uses it is sometimes advisable to incorporate surface active agents which may vary widely depending upon the use, acidity and alkalinity of the ultimate product. When employed as an alkaline cleaning agent, alkaline stable agents such as sulfates of long chain alcohols such as dodecanol up to octadecanol (e.g., sodium lauryl sulfate), sulfonated amide and ester derivatives, and alkyl aryl sulfonates (e.g., dodecyl benzene sodium sulfonate) may be used. Both cationic and anionic agents come under consideration in the alkaline field. Of course, non-ionic agents, if sufficiently stable may be employed.

I claim:

1. A chemical composition consisting essentially of a mixture of (a) a member selected from the group consisting of an alkali metal pyrosulfate, an alkaline earth metal pyrosulfate or mixtures thereof and (b) a member selected from the group consisting of an alkali metal hypochlorite, an alkaline earth metal hypochlorite or mixtures thereof, component (a) being present in from about 1 to about 99 parts by weight and component (b) being present in from about 99 to 1 parts by weight.

2. The chemical composition according to claim 1 wherein component (b) is an alkali or alkaline earth metal hypochlorite and component (a) is present in an amount of from about 0.5 to about 50 percent by weight.

3. The chemical composition according to claim 1 wherein component (b) is an alkali or alkaline earth metal hypochlorite.

4. An aqueous medium containing the composition according to claim 2.

* * * * *